United States Patent [19]

Toyoda et al.

[11] Patent Number: 4,663,216
[45] Date of Patent: May 5, 1987

[54] SYNTHETIC PAPER PRINTABLE IN HIGH GLOSS

[75] Inventors: Takashi Toyoda; Akira Akimoto; Masaaki Yamanaka; Yonetarou Kobayasi, all of Ibaraki, Japan

[73] Assignee: Oji Yuka Goseishi Co., Ltd., Tokyo, Japan

[21] Appl. No.: 739,818

[22] Filed: May 31, 1985

[30] Foreign Application Priority Data

Jun. 18, 1984 [JP] Japan .................................. 59-124882

[51] Int. Cl.⁴ .............................................. B32B 5/16
[52] U.S. Cl. ................................... 428/212; 428/323; 428/335; 428/409; 428/474.4; 428/476.3; 428/476.9
[58] Field of Search ................... 428/323, 476.3, 476.9, 428/516, 523, 537.5, 910, 409, 474.4

[56] References Cited

U.S. PATENT DOCUMENTS

| 3,799,828 | 3/1974 | Takashi et al. ..................... 156/229 |
| 4,341,880 | 7/1982 | Toyoda et al. ...................... 524/570 |
| 4,420,530 | 12/1983 | Toyoda et al. ..................... 156/229 |
| 4,472,227 | 9/1984 | Toyoda et al. ................. 156/244.11 |

FOREIGN PATENT DOCUMENTS 1403237 8/1975 United Kingdom .

Primary Examiner—Edith Buffalow
Attorney, Agent, or Firm—Oblon, Fisher, Spivak, McClelland & Maier

[57] ABSTRACT

A synthetic paper printable in high gloss comprises (1) a multilayer support, (2) a layer of a transparent film of a thermoplastic resin free from an inorganic fine powder formed on one surface of the support (1), and (3) a primer layer of a specific material. The support (1) comprises (1a) a base layer of a biaxially stretched film of a thermoplastic resin and a surface and a back layer (1b) and (1c) composed of a monoaxially stretched film of a thermoplastic resin containing from 8 to 65% by weight of an inorganic fine powder.

10 Claims, 1 Drawing Figure

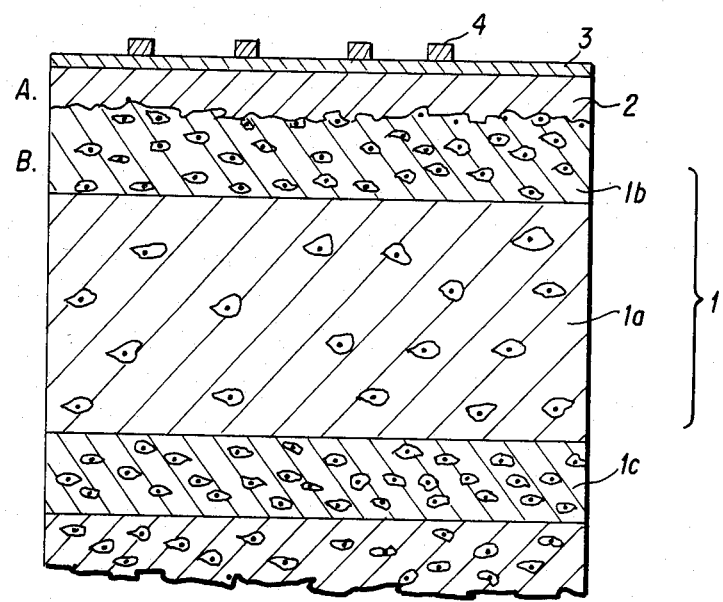

SYNTHETIC PAPER PRINTABLE IN HIGH GLOSS

FIELD OF THE INVENTION

This invention relates to a synthetic paper having excellent paper supply property and ink transfer property and free from curling, which can provide the advantage that multicolor prints thereon have a high gloss.

BACKGROUND OF THE INVENTION

Synthetic papers, or probably more accurately termed paper-like sheets, comprising a biaxially stretched film of polypropylene as a base layer and monoaxially stretched films of polypropylene containing 8 to 65% by weight of an inorganic fine powder formed on both surfaces of the base layer as paper-like layers have been proposed and come into commercial acceptance in place of conventional pulp papers as described in, for example, Japanese Patent Publication No. 40794/71 and Japanese Patent Application (OPI) Nos. 141339/81 and 118437/81 (the term "OPI" as used herein refers to a "published unexamined Japanese patent application").

Such synthetic papers have fine pores around the nuclei of the inorganic fine powder and numerous long cracks on both surfaces. They are light in weight and have excellent drying property of a printing ink, adhesion of a printing ink, writing property with a pencil and waterproofness.

To impart better offset printing property, those synthetic papers are used after their surfaces are coated with an aqueous solution of an acrylic copolymer, polyethyleneimine, etc., in an amount of a solids content of from 0.005 to 1 g/m² and dried as described in, for example, Japanese Patent Application (OPI) Nos. 10624/75, 161478/75, 40883/73 and 149363/82.

The synthetic papers having such a coated resin layer are used as labels on containers holding liquids such as motor oil and shampoo, blanks of fancy foods, and art paper for maps and posters.

The surfaces of those synthetic papers are rough (a Bekk index, measured in accordance with JIS P-8119, of from 100 to 2,000 seconds) because the paper-like layer is a stretched film of a thermoplastic resin containing an inorganic fine powder and the coated resin layer is as thin as 0.01μ or less.

Papers for posters are required to be offset-printed in multicolors with excellent gloss. In particular, in those posters which advertise or publicize package tours and motion pictures or promote the sales of records, automobiles, carbonated drinks, etc., using young female models, multicolor offset prints of strong gloss are preferred in order to create a bright and light-hearted atmosphere.

Such posters have been previously produced by applying offset multicolor prints to the surface of a synthetic paper having the above-described coated resin layer, coating an isocyanate type primer on the printed surface, and then laminating a transparent polyvinyl chloride film onto the primer layer. Because of the surface smoothness of the polyvinyl chloride film on the surface, those posters look as if prints of excellent gloss were made.

The production of those posters having a laminated layer of polyvinyl chloride additionally requires a transportation expense because they come through both printers and laminaters. To the users, direct delivery of the posters from the printers is advantageous in regard to both time and cost.

SUMMARY OF THE INVENTION

As a result of various investigations to provide a synthetic paper which can be directly offset-printed in high gloss and has satisfactory paper supply property, paper discharge property, paper-like feel and anti-curling property, it has been found that the synthetic paper having a specific structure can meet those requirements.

Accordingly, an object of the present invention is to provide a synthetic paper printable in high gloss, the synthetic paper comprising (1) a support of a multilayer film comprising a base layer (1a) of a biaxially stretched film of a thermoplastic resin, a surface layer (1b) and a back layer (1c), (1b) and (1c) each being a monoaxially stretched film of a thermoplastic resin containing from 8 to 65% by weight of an inorganic fine powder, (2) a layer of a transparent film of a thermoplastic resin free from an inorganic fine powder formed on the surface layer (1b) of the support, and (3) a primer of a material selected from the group consisting of polyethyleneimine, poly(ethyleneimine-urea), ethyleneimine-adducts of polyamine polyamides, epichlorohydrin-adducts of polyamine polyamides and quaternary nitrogen-containing polymers.

BRIEF DESCRIPTION OF THE DRAWING

Figure is a cross-sectional view of the synthetic paper according to the present invention.

DETAILED DESCRIPTION OF THE INVENTION

In the synthetic paper of this invention as shown in the drawing, the support (1) has a multilayer structure comprising (1a) a base layer of a biaxially stretched film of a thermoplastic resin and surface and back layers (1b) and (1c) of a monoaxially stretched film of a thermoplastic resin containing from 8 to 65% by weight of an inorganic fine powder. The support (1) can be produced by the methods described in the specifications of the above-described Japanese Patent Publication No. 40794/71, Japanese Patent Application (OPI) Nos. 141339/81 and 118437/81 and Japanese Patent Application No. 67842/81.

Specifically, this multilayer structure may be produced, for example, by stretching a film of a thermoplastic resin containing from 0 to 50% of an inorganic fine powder in one direction at a temperature lower than the melting point of the resin, laminating a molten film of a thermoplastic resin containing from 8 to 65% by weight of an inorganic fine powder onto both surfaces of the resulting monoaxially stretched film, and thereafter stretching the laminated film in a direction at right angles to the above-described direction. In the resulting product, the paper-like layer is a film which is monoaxially oriented and having numerous fine pores, and the base layer is oriented biaxially.

Such a three-layer structure is the simplest structure of the support, and another resin layer may be present between the paper-like layer and the base layer as described in, for example, Japanese Patent Application (OPI) No. 181829/82.

The base layer (1a) of the biaxially stretched film in the support (1) contributes to a balance between the longitudinal and transverse strengths of the synthetic paper. The paper-like layers (1b, 1c) of the monoaxially stretched film serve to present a paper-like feel. If the paper-like layer is biaxially oriented, it has a pearlescent luster and is far from a paper-like feel.

Examples of the thermoplastic resin include polyolefin resins (such as polyethylene, polypropylene, ethylene/propylene copolymer, and ethylene/vinyl acetate copolymer), poly(4-methylpentene-1), polystyrene, polyamides, polyethylene terephthalate, a partially hydrolyzed product of ethylene/vinyl acetate copolymer, ethylene/acrylic acid copolymer, salts of ethylene/acrylic acid copolymer, vinylidene chloride copolymers (such as vinyl chloride/vinylidene chloride copolymer), and blends of those polymers. Polypropylene and polyethylene are especially preferred because of their excellent waterproofness and resistance to chemicals. When polypropylene is used as the base layer, it is preferable to incorporate from 3 to 25% by weight of a resin having a lower melting point than the polypropylene, such as polyethylene, polystyrene or ethylene/vinyl acetate copolymer, in order to improve its stretchability.

The adhesion between the base layer and the paper-like layer is higher when the thermoplastic resins constituting those layers are the same kind. The stretching of the support (1) becomes easy if a resin having a higher melt index (measured in accordance with, for example, JIS K-6758, JIS K-6780) than the resin of the base layer is used.

Examples of the inorganic fine powder are fine powders of calcium carbonate, silica, diatomaceous earth, talc, titanium oxide and barium sulfate having a particle diameter of from about 0.03 to 16 microns.

The stretch ratio is preferably from 4 to 10 both in the longitudinal and transverse directions. The stretching temperature is from 150° to 162° C. for homopolypropylene (melting point: 164°–167° C.), from 110° to 120° C. for high density polyethylene (melting point: 121° to 124° C.), and from 104° to 115° C. for polyethylene terephthalate (melting point: 246°–252° C.). The stretching speed is from about 50 to 350 m/min.

If the stretch ratio, the stretching temperature, the stretching speed and the content of the inorganic fine powder are selected such that the smoothness (Bekk index) of the paper-like layers (1b, 1c) becomes 3,000 seconds or less, preferably 2,000 seconds or less, the paper-like layers can permit writing with a pencil, and the supply and discharge of the resulting synthetic paper are improved.

The transparent thermoplastic resin film layer (2) free from an inorganic fine powder is formed on the paper-like layer (1b) of the support. The paper-like layer (1c) on the opposite side becomes a back layer of the synthetic paper. The thermoplastic resin forming the transparent film layer (2) may, for example, be low density polyethylene, polypropylene, polyethylene terephthalate, polyamides, etc. The transparent film layer (2) can be formed on the support (1) by, for example, a method which comprises coating a polyurethane type or polyester type primer on the surface of the paper-like layer (1b) of the support (1) and then extruding a molten film of the thermoplastic resin (2) onto the primer by an extrusion dry laminating technique; or by a method which comprises laminating a molten laminated film of the thermoplastic resin containing from 8 to 65% by weight of the inorganic fine powder for formation of the paper-like layer (1b) and the thermoplastic resin containing no inorganic fine powder for formation of the transparent film layer (2), extruded from a coextrusion die, onto one surface of the longitudinally stretched film (1a) as the base layer in the production of the support (1), extrusion-laminating a molten film of the thermoplastic resin containing from 8 to 65% by weight of the inorganic fine powder for the formation of the back layer (1c) of the support (1), and stretching the laminated film transversely.

The example of the polyurethane type primer is EL-150 (trade name) of Toyo Morton Co., Ltd., and the example of the polyester type elastomer is AD-503 (trade name) of the same company. The primer is coated at a rate of from 0.5 to 5 g/m².

Generally, the transparent resin film layer (2) has a thickness of from 2 to 20 microns, and the support (1) has a thickness of from 60 to 400 microns. It is important that the transparent film (2) has a smoothness (Bekk index) of at least 6,000 seconds. As the Bekk index is higher, prints of higher gloss can be obtained, and the ink transfer property is better. Better ink transfer property leads to a lesser amount of ink used.

The transparent film (2) has excellent smoothness and therefore excellent ink transfer property. However, since its ink adhesion is poor, its surface is treated with a primer. The primer is selected from polyethyleneimine, poly(ethyleneimine-urea), ethyleneimine adducts of polyamine polyamides, epichlorohydrin adducts of polyamine polyamides and quaternary nitrogen-containing polymers. An alkali metal salt or an alkaline earth metal salt may be incorporated in the primer in order to promote the drying of ink. When the transparent film layer (2) is composed of a homopolymer, the primer (3) composed of the following components (A), (B), (C) and (D) gives an offset multicolor print (4) having excellent adhesion.

(A) A quaternary nitrogen-containing polymer: 100 parts by weight
(B) A polyimine compounds selected from polyethyleneimine poly(ethyleneimine-urea) and ethyleneimine adducts of polyamidepolyamines. 20 to 500 parts by weight
(C) An epichlorohydrin adduct of a polyamine polyamide. 20 to 500 parts by weight
(D) An alkali metal salt or an alkaline earth metal salt. 5 to 50 parts by weight The acrylic polymer of component (A) is a water-soluble quaternary nitrogen-containing polymer having antistatic function. The term "quaternary" as used herein is to be understood as encompassing the term "amphoteric".

Such a quaternary nitrogen-containing polymer can be prepared by the polymerization of the corresponding nitrogen-containing monomer and as required, by quaternization of the resulting tertiary nitrogen-containing polymer.

Suitable examples of the nitrogen-containing monomer in the present invention are as follows.

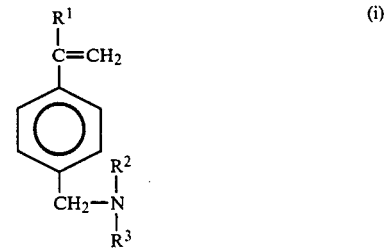

-continued

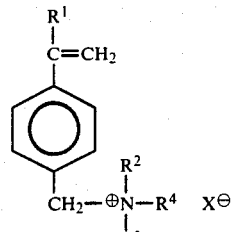 (ii)

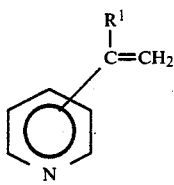 (iii)

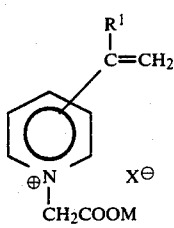 (iv)

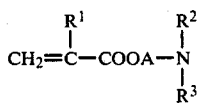 (v)

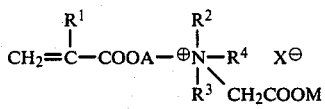 (vi)

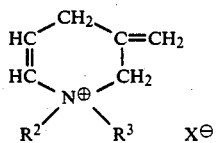 (vii)

In the above formulae, $R^1$ represents hydrogen or a methyl group; $R^2$ and $R^3$ each represents a lower alkyl group preferably having 1 to 4 carbon atoms and more preferably having 1 or 2 carbon atoms; $R^4$ represents a saturated or unsaturated alkyl group having 1 to 22 carbon atoms; $X^\ominus$ represents a counter anion of quaternized $N^\oplus$ (for example, a halide especially a chloride); M represents an alkali metal ion (especially a sodium, potassium or lithium ion); and A represents an alkylene group having 2 to 6 carbon atoms.

Needless to say, the quaternary nitrogen-containing monomers (ii), (iv), (vi) and (vii) can be caused to be present in the polymer by polymerizing their precursors (i), (iii) and (v), respectively, and quaternizing the products with a cationizing agent such as an alkyl halide, dimethylsulfuric acid or a monochloroacetic acid ester.

In the present invention, the primer must be water-soluble, but it is not desired to be excessively water-soluble. Hence, the quaternary nitrogen-containing polymer is desirably a copolymer with a hydrophobic monomer. Examples of the hydrophobic monomer are styrene, nucleus- or side chain-substituted products of styrene, acrylic or methacrylic acid esters, and vinyl halides.

Especially suitable polymers (A) are composed of the following components (a) to (c).

| | | |
|---|---|---|
| (a) Monomer (i) to (vii) | | 20 to 40% by weight |
| (b) $CH_2=C-COOR^5$<br>    $\quad\quad\;\; \|$<br>    $\quad\quad\;\; R^1$<br>($R^1$ is hydrogen or a methyl group, and $R^5$ is an alkyl group having 1 to 18 carbon atoms) | | 6 to 80% by weight |
| (c) Another hydrophobic vinyl monomer | | 0 to 20% by weight |

The most suitable acrylic polymer of component (A) is a polymer wherein the monomer (a) is the monomer (vi) and $X^\ominus$ is $Cl^\ominus$.

Polyethyleneimine, a copolymer of ethyleneimine and urea [poly(ethyleneimine-urea)] or the ethyleneimine adduct of polyamine polyamide in component (B) is a water-soluble polymer.

The degrees of polymerization of those polymers, the content of the urea units in poly(ethyleneimineurea), and the amount of ethyleneimine added in the adduct are not limited in particular so long as these factors serve to achieve an improvement in the adhesion of a printing ink.

The polyamine polyamide/epichlorohydrin adduct as the component (C) of the primer is a water-soluble cationic thermosetting resin obtained by reacting a polyamide obtained from a polyalkylenepolyamine and a saturated dibasic carboxylic acid having from 3 to 10 carbon atoms, with epichlorohydrin. The details of this resin are described in Japanese Patent Publication No. 3547/60. Specific examples of the saturated dibasic carboxylic acid having from 3 to 10 carbon atoms are dicarboxylic acids having from 4 to 8 carbon atoms, especially adipic acid. Specific examples of the polyalkylenepolyamine are polyethylenepolyamines, especially ethylenediamine, diethylenetriamine and triethylenetetramine. Diethylenetriamine is especially preferred. The mole ratio of the polyalkylene polyamine to dibasic acid in the polyamide forming reaction is usually from 0.9:1 to 1.2:1. In the reaction of the polyaminepolyamide with epichlorohydrin, epichlorohydrin is usually used in an amount of from about 0.5 to 1.8 moles per mole of the secondary amino groups in the polyamides.

The water-soluble alkali metal salt or alkaline earth metal salt as component (D) has an effect of increasing the antistatic function of the primer and promoting the drying of an offset printing ink. Since, however, the presence of a water-soluble inorganic salt reduces the water resistant adhesion of ink, its presence in excessively large amounts is undesirable.

Examples of preferred water-soluble inorganic salts include sodium carbonate, potassium carbonate, sodium hydrogencarbonate, sodium sulfite and other alkaline salts; and sodium chloride, sodium sulfate, sodium nitrate and other neutral salts.

The coating composition comprising the primers (A), (B) and (C) and the water-soluble inorganic salt (D) is used as an aqueous solution having a concentration of 0.5 to 3% by weight. The solution is coated on the transparent film (2) by such a coating means as a roll, a sprayer or a brush at a rate of 0.01 to 1.0 g/m² (solids), and dried.

The primer layer (3) of the synthetic paper thus obtained has a smoothness nearly the same as that of the transparent film (2) as represented by its Bekk index of from 6,000 to 30,000 seconds.

The synthetic resin thus obtained has excellent ink transfer property and adhesion of an offset printing ink. Its printed surface has a high gloss.

Since the primer layer (3) and the transparent film layer (2) of this synthetic paper cover the paper-like layer (1b) containing the fine powder, this synthetic paper is free from the problem of dropping of the inorganic fine powder from the paper-like layer which is called "paper powder trouble". Accordingly, this synthetic paper is useful for drawing a flow chart or a poster for feasting the eyes of working personnel which is pasted on the wall of a room where dirt and dust are undesired, for example, in a room for production of IC or LSI.

The synthetic paper of the present invention can be printed not only by offset printing, but also by gravure printing, flexographic printing and screen printing.

The following examples illustrate the present invention in greater detail.

PRODUCTION EXAMPLES OF MULTILAYER SYNTHETIC PAPERS

Production Example 1

(1) A mixture of 80% by weight of polypropylene having a melt index (MI) of 0.8 and 8% by weight of high density polyethylene was mixed with 12% by weight of calcium carbonate having an average particle diameter of 1.5 microns (C), and the mixture was kneaded in an extruder kept at 270° C. and extruded into a sheet. The extruded sheet was cooled by a cooling device to obtain an unstretched sheet. The sheet was heated to 140° C. and then stretched to 5 times in the longitudinal direction. (2) Polypropylene (A) having an MI of 4.0 and a composition (B) composed of 55% by weight of polypropylene having an MI of 4.0 and 45% by weight of calcium carbonate having an average particle diameter of 1.5 microns were melt-kneaded in separate extruders, and laminated within a die and coextruded. The extruded sheet was laminated onto the stretched sheet (1) so that the (A) side of the coextruded sheet was located outside. Then, a composition (E) composed of 49% by weight of polypropylene having an MI of 4.0, 5% by weight of maleic acid-modified polypropylene having a maleic acid content of 0.5% by weight, and 46% by weight of calcium carbonate having an average particle diameter of 1.5 microns (the amount of the modifying maleic acid monomer per 100 parts by weight of the filler was 0.05 part by weight), which was melt-extruded in an extruder kept at 270° C., and a composition (D) composed of 50% by weight of polypropylene having an MI of 4.0 and 50% by weight of calcium carbonate having an average particle diameter of 1.5 microns, which was melt-kneaded in another extruder kept at 270° C., were laminated in a die and coextruded onto the other side of the 5:1 stretched sheet so that the layer (E) containing the modified polypropylene was located outside. The 5-layer laminate was then heated to 155° C., and stretched to 7.5 times in the transverse direction to obtain a 5-layer sheet.

(3) The surface of the 5-layer sheet was subjected to a corona discharge treatment to obtain a 5-layer sheet composed of the layers (A), (B), (C), (D) and (E) having a thickness of 5, 25, 50, 25 and 5 microns, respectively.

The surface (A) of this 5-layer structure had a Bekk index of 8,000 seconds.

Production Example 2

A 5-layer structure having a surface Bekk index of 1,500 seconds was produced in the same manner as in Production Example 1 except that the composition of (A) was changed as follows:

| | |
|---|---|
| Polypropylene | 96% by weight |
| Maleic acid-modified polypropylene | 1% by weight |
| Calcium carbonate | 3% by weight |

Production Example 3

A resin composition composed of 80% by weight of polypropylene having an MI of 4.0, 4% by weight of high density polyethylene and 16% by weight of calcium carbonate was extruded at 270° C., cooled, stretched to 5 times longitudinally at 140° C., again heated to 155° C., then stretched transversely to 5.2 times, subjected to a corona discharge treatment, and annealed at 160° C. to give a synthetic paper having a thickness of 110 microns.

The synthetic paper had a pearlescent luster and a Bekk index of 10,500 seconds.

Production Examples 4 and 5

A polyester type primer, "AD-503" (trade name) made by Toyo Morton Co., Ltd., was coated at a rate of 1 g/m² on one surface of each of the supports obtained in Production Examples 2 and 3. Propylene homopolymer having an MI of 4.0 or a composition composed of the propylene homopolymer and calcium carbonate having a particle diameter of 1.5 microns in the proportions indicated in Table 1 was extruded at 270° C. into a film form onto the primer-coated surface and laminated onto the support by a roll. The assembly laminate was cooled to 60° C. and its surface was subjected to a corona discharge treatment to obtain a laminate having a film layer (thickness: 10 microns) with the smoothness shown in Table 1.

Example 1 To 3

Aqueous coating solutions of the various compositions shown in Table 1 were each coated at a rate of 0.05 g/m² as solids on the surface of the polypropylene film in the laminate obtained in Production Example 1, and dried at 20° C. to produce synthetic papers for printing.

Offset printing in four colors (black, blue, red and yellow) was performed on the polypropylene film surface side of each of those synthetic papers using an offset printing ink "TSP-400" (trade name) produced by Toyo Ink Mfg., Co., Ltd. on an offset 4-color printing press made by Komori Printing Press Co., Ltd. The ink transfer property, adhesion of the ink, continuous offset printing property, the gloss of the prints, the supply and discharge property of the synthetic papers, and the presence or absence of plate staining were evaluated by the following methods. The results obtained are shown in Table 1 below.

Methods of Evaluating the Printing Characteristics

Ink Transfer Property:

A halftone dot portion of each color was enlarged to 30 times by a magnifying glass, and the reproducibility of the dot was visually evaluated.

Dot reproduction rate:
100–75%: Good (o)
75–50%: Slightly poor (Δ)
50–0% Poor (x)

Ink Adhesion:
An adhesive tape, "Cellotape" (trade name) made by Nichiban Co., Ltd., was adhered strongly to the printed surface and quickly peeled along the printed surface. The degree of ink separated from the paper surface was visually evaluated.

Ink remaining ratio:
100–95%: Good (o)
95–80%: Slightly poor (Δ)
80–0%: Poor (x)

Continuous Offset Printing Property:
5,000 copies were continuously printed, and the ink edge pile on the blanket and the whiteness of the blanket were compared with those before the printing. The printed copy obtained immediately after the start of printing and that obtained after the continuous printing were compared, and their halftone dot reproducibilities were visually evaluated.

State of the blanket:
Same as that before the printing (o)
Slight difference (Δ)
Great difference (x)

Gloss of the Print:
The gloss of the solid printed surface was measured using a glossmeter made by Suga Testing Device Co., Ltd. The state of light reflection of the entire print was visually observed.

State of light reflection of the entire print:
Good (o)
Slightly good (Δ)
Poor (x)

Supply-Discharge Property of the Synthetic Paper:
The state of supply of the synthetic paper from the feeder portion of a printing press was evaluated by visually observing paper separation and the state of paper registering at the holding portion and the state of paper dropping at the paper discharge portion.

Plate Staining:
The state of staining of the printing plate by ink during continuous printing of 5,000 copies was visually evaluated.

Comparative Examples 1 and 2

Synthetic papers were produced in the same manner as in Example 1 except that the supports obtained in Production Examples 2 and 3 having no propylene homopolymer film layer were used.

The results obtained are shown in Table 1 below.

TABLE 1

| Example | Laminated Structure Production Example | Laminated Structure Bekk Index (sec) | Coating Agent Composition (parts by weight) (A) Quaternary N—Containing Acrylic Polymer | (B) Polyethyleneimine | (C) | (D) Inorganic Salt | Amount Coated (g/m²) |
|---|---|---|---|---|---|---|---|
| 1-A | 1 | 8,000 | "CHEMISTAT 500" (100) | "POLYMIN P" (25) | "AF-100" (25) | Na₂CO₃ (10) | 0.05 |
| 1-B | " | " | "ST-1000" (100) | "POLYMIN SN" (50) | "AF-100" (50) | Na₂CO₃ (10) | " |
| 1-C | " | " | "ST-1100" (100) | "POLYMIN SN" (30) | "KYMENE" (30) | Na₂CO₃ (15) | " |
| 1-D | " | " | "CHEMISTAT 6200" (100) | "POLYMIN P" (20) | — | Na₂CO₃ (10) | " |
| 1-E | " | " | "GOSEFIMER C-670" (150) | "POLYMIN P" (120) | "AF-100" (100) | Na₂SO₃ (10) | " |
| 1-F | " | " | "ST-1100" (200) | "POLYMIN SN" (100) | "AF-100" (100) | Na₂CO₃ (20) | 0.1 |
| 1-G | " | " | "CHEMISTAT 5500" (100) | "POLYMIN SN" (200) | "AF-100" (200) | Na₂CO₃ (20) | " |
| 2 | 4 | 7,500 | "CHEMISTAT 5500" (100) | "POLYMIN SN" (50) | "AF-100" (50) | Na₂CO₃ (20) | 0.05 |
| 3 | 5 | 8,900 | "CHEMISTAT 5500" (100) | "POLYMIN SN" (50) | "AF-100" (50) | Na₂CO₃ (20) | " |
| Comp. Ex. 1 | 2 | 3,500 | "CHEMISTAT 5500" (100) | " | "AF-100" (50) | Na₂CO₃ (20) | " |
| Comp. Ex. 2 | 3 | 10,500 | "CHEMISTAT 5500" (100) | " | "AF-100" (50) | Na₂CO₃ (20) | " |

| Example | Evaluation of the Synthetic Paper Ink Transfer Property | Ink Adhesion | Gloss of Print | Continuous Printing Property | Paper Supply-Discharge Property | Plate Staining | Remarks |
|---|---|---|---|---|---|---|---|
| 1-A | Δ~o | o | o | 5,000 | o | o | |
| 1-B | o | o | o | 5,000 or more | o | o | |
| 1-C | o | o | o | 5,000 or more | o | o | |
| 1-D | Δ~o | Δ~o | o | 4,500 | o | o | |
| 1-E | Δ~o | o | o | 4,500 | o | o | |
| 1-F | o | o | o | 5,000 or more | o | o | |
| 1-G | Δ~o | o | o | 4,500 | o | Δ~o | |
| 2 | o | o | o | 4,500 | o | o | Slight curling |
| 3 | o | o | o | 4,500 | o | o | Slight curling |

TABLE 1-continued

| | | | | | | |
|---|---|---|---|---|---|---|
| Comparative Example 1 | o | o | x | 1,000 | o | o |
| Comparative Example 2 | Δ | oΔ | Δ | 3,000 | o | o |

In Table 1, the compounds given by trade names are produced by the following manufacturers.

"CHEMISTAT 5500" and "CHEMISTAT 6200": Sanyo Chemical Co., Ltd.
"ST-1000" and "ST-1100": Mitsubishi Yuka Fine Chemicals Co., Ltd.
"GOSEFIMER C-670": Nippon Gosei Kagaku Co., Ltd.
"POLYMIN P" and "POLYMIN SN": BASF A.G.
"AF-100" Arakawa Chemical Co., Ltd.
"KYMENE": Dick Hercules Co.

While the invention has been described in detail and with reference to specific embodiments thereof, it will be apparent to one skilled in the art that various changes and modifications can be made therein without departing from the spirit and scope thereof.

What is claimed is:

1. A synthetic paper printable in high gloss, said synthetic paper comprising:
   (1) a support of a multilayer film comprising (1a) a base layer of a biaxially stretched film of a thermoplastic resin and (1b) a surface layer and (1c) a back layer each of said layers (1b) and (1c) being composed of a monoaxially stretched film of a thermoplastic resin containing from 8 to 65% by weight of a fine inorganic powder,
   (2) a layer of a transparent film of a thermoplastic resin not containing a fine inorganic powder and which is formed on the surface layer (1b) of the support and wherein the surface of the transparent film layer has a Bekk index of from 6,000–30,000 seconds, and
   (3) a primer of a material selected from the group consisting of polyethyleneimine, poly(ethyleneimineurea), ethyleneimine-adducts of polyamine polyamides, epichlorohydrin-adducts of polyamine polyamides and quaternary nitrogen-containing polymers; and wherein said primer is located on the outer side of said transparent film of thermoplastic resin.

2. The synthetic paper of claim 1, wherein the thermoplastic resin of the film layer (2) is a homopolymer.

3. The synthetic paper of claim 1, wherein said primer comprises:
   (A) 100 parts by weight of a quaternary nitrogen-containing polymer,
   (B) 20 to 500 parts by weight of a polyimine compound selected from the group consisting of polyethyleneimine, poly(ethyleneimine-urea) and ethyleneimine adducts of polyamine polyamides,
   (C) 20 to 500 parts by weight of epichlorohydrin adducts of polyamine polyamides, and
   (D) 5 to 50 parts by weight of an alkali metal salt or an alkaline earth metal salt.

4. The synthetic paper of claim 1, wherein the thermoplastic resin of support layers (1a), (1b) and (1c) is a film of a polyolefin or resin selected from the group consisting of polyethylene, polypropylene, ethylene/propylene copolymer, ethylene/vinylacetate copolymer, poly(4-methylpentene-1), polystyrene, polyamides, polyethylene terephthalate, a partially hydrolyzed product of ethylene/vinylacetate copolymer, ethylene/acrylic acid copolymer, salts of ethylene/acrylic acid copolymer, vinylidene chloride copolymers and mixtures thereof.

5. The synthetic paper of claim 4, wherein said thermoplastic resin is selected from the group consisting of polyethylene and polypropylene.

6. The synthetic paper of claim 1, wherein the thermoplastic resin of layer (2) is selected from the group consisting of low density polyethylene, polypropylene, polyethylene terephthalate and polyimides.

7. The synthetic paper of claim 1, wherein the thermoplastic resins of layers (1a), (1b), and (1c) are the same.

8. The synthetic paper of claim 1, wherein the layers (1b) and (1c) are stretched with a stretch ratio of from 4 to 10 in the longitudinal direction and layer (1a) is stretched with the same ratio in both the longitudinal and transverse directions.

9. The synthetic paper of claim 1, wherein said fine inorganic powder is selected from the group consisting of calcium carbonate, silica, diatomaceous earth, talc, titanium oxide and barium sulfate having a particle diameter of from about 0.03–16 μm.

10. The synthetic paper of claim 1, wherein said transparent resin film layer (2) has a thickness of from 2–20 μm, and said support layer (1) has a thickness of from 60–400 μm.

* * * * *